United States Patent
Hayashibara et al.

(10) Patent No.: US 10,724,604 B2
(45) Date of Patent: Jul. 28, 2020

(54) SPEED REDUCING DEVICE

(71) Applicants: NABTESCO CORPORATION, Tokyo (JP); CHIBA INSTITUTE OF TECHNOLOGY, Chiba (JP)

(72) Inventors: Yasuo Hayashibara, Narashino (JP); Kazuyoshi Makisumi, Narashino (JP); Fumihiro Kawasaki, Narashino (JP); Hideshi Shimada, Tsu (JP); John Verzemnieks, Tsu (JP)

(73) Assignees: NABTESCO CORPORATION, Tokyo (JP); CHIBA INSTITUTE OF TECHNOLOGY, Chiba (JP)

( * ) Notice: Subject to any disclaimer, the term of this patent is extended or adjusted under 35 U.S.C. 154(b) by 165 days.

(21) Appl. No.: 15/944,111

(22) Filed: Apr. 3, 2018

(65) Prior Publication Data
US 2018/0291995 A1    Oct. 11, 2018

(30) Foreign Application Priority Data

Apr. 5, 2017 (JP) .................................. 2017-075333

(51) Int. Cl.
*F16H 1/06* (2006.01)
*F16H 55/18* (2006.01)
(Continued)

(52) U.S. Cl.
CPC .............. *F16H 1/32* (2013.01); *B25J 9/103* (2013.01); *F16H 49/001* (2013.01); *F16H 55/18* (2013.01);
(Continued)

(58) Field of Classification Search
CPC .......... F16H 1/32; F16H 49/001; F16H 55/18; F16H 57/01; F16H 57/028; F16H 57/082;
(Continued)

(56) References Cited

U.S. PATENT DOCUMENTS 7,281,445 B2 * 10/2007 Sasaki ................... F02D 9/1065
185/37
8,684,878 B2 * 4/2014 Sato ........................ F16H 25/06
475/168
(Continued)

FOREIGN PATENT DOCUMENTS

DE    10 2014 105 321 A1    10/2015
GB          2316494 A        2/1998
(Continued)

OTHER PUBLICATIONS

Search Report dated Sep. 13, 2019 issued in corresponding German Patent Application No. 10 2018 205 154.2 with English translation.
(Continued)

*Primary Examiner* — Adam D Rogers
(74) *Attorney, Agent, or Firm* — Pillsbury Winthrop Shaw Pittman, LLP

(57) ABSTRACT

One object is to provide a speed reducer provided with a buffer mechanism for reducing an external force and capable of reliably measuring a load torque during an operation. A speed reducing device includes a speed reducing mechanism for reducing a rotation speed of an output with respect to an input between an input rotary shaft and an output rotary shaft, a housing that houses the speed reducing mechanism, and a buffer unit formed of an elastic member and having a cushion force acting mainly in a substantially rotational tangential direction. An amount of displacement of the housing generated by the buffer unit is measured by a measurement device.

4 Claims, 7 Drawing Sheets

(51) Int. Cl.
  *F16H 1/32* (2006.01)
  *B25J 9/10* (2006.01)
  *F16H 49/00* (2006.01)

(52) U.S. Cl.
  CPC .. *F16H 2001/324* (2013.01); *F16H 2055/185* (2013.01)

(58) Field of Classification Search
  CPC ......... F16H 2001/324; F16H 2055/185; F16H 2057/012; F16H 2057/02069; B25J 9/046; B25J 9/06; B25J 9/103
  See application file for complete search history.

(56) References Cited

U.S. PATENT DOCUMENTS

| | | | |
|---|---|---|---|
| 9,783,262 B2 * | 10/2017 | Dubose | B62M 6/55 |
| 10,378,613 B1 * | 8/2019 | Lee | F16H 48/06 |
| 2012/0286629 A1 | 11/2012 | Johnson et al. | |

FOREIGN PATENT DOCUMENTS

| | | | | |
|---|---|---|---|---|
| JP | 2014-084989 A | 5/2014 | | |
| WO | WO-2016158201 A1 * | 10/2016 | ............... | F16H 1/32 |
| WO | 2018/064709 A1 | 4/2018 | | |

OTHER PUBLICATIONS

Office Action dated Apr. 7, 2020 issued in corresponding German Patent Application No. 10 2018 205 154.2 with English translation (11 pages).

* cited by examiner

SPEED REDUCING DEVICE

CROSS-REFERENCE TO RELATED APPLICATIONS

This application is based upon and claims the benefit of priority from Japanese Patent Application No. 2017-075333 (filed on Apr. 5, 2017), the entire contents of which are incorporated herein by reference.

TECHNICAL FIELD

The present invention relates to a speed reducing device having a function of absorbing an impact and capable of reliably measuring a load torque.

BACKGROUND

In recent years, industrial robots have been studied for use in cooperative work with humans, and a number of industrial robots capable of such cooperative work have been developed and marketed by various manufacturers. A speed reducing device is known as an important technical component for achieving an operation of such an industrial robot. The speed reducing device is combined with a servomotor so as to constitute a joint of the industrial robot. A condition required of the speed reducing device used in the industrial robot is reduced backlash.

Furthermore, in recent years, humanoid robots have been actively studied and are expected to deliver excellent performance in various fields. A speed reducing device is known as an important technical component for achieving an operation of such a humanoid robot. The speed reducing device is combined with a servomotor so as to constitute a joint of the humanoid robot. A condition required of the speed reducing device used in the humanoid robot is reduced backlash.

Examples of a speed reducing device reduced in backlash include a planetary gear speed reducer, an eccentric oscillating speed reducer, and a strain wave gearing speed reducer. The strain wave gearing speed reducer, in particular, is not only reduced in backlash but also high in speed reduction ratio, lightweight, and compact and thus has seen extensive use in joints of compact industrial robots and humanoid robots (Japanese Patent Application Publication No. 2014-84989).

The strain wave gearing speed reducer, however, is disadvantageous in the following respect. That is, the strain wave gearing speed reducer has a unique configuration in which a flex spline is bent into an elliptical shape by a wave generator, and teeth thereof are engaged at its long axis portion with inner teeth of an outer ring, and thus the strain wave gearing speed reducer has a property of readily leading to a phenomenon in which, when subjected to an external impact, the teeth of the flex spline and the internal teeth of the outer ring are disengaged from each other (loss of synchronism).

In a humanoid robot intended to walk with two legs, in addition to an impact undergone due to tipping or the like, an excessive load on a speed reducing device unexpectedly generated at the time of performing an intended operation is also exerted as an impact on the speed reducing device. When the strain wave gearing speed reducer having a flexible configuration is subjected to such an external force, loss of synchronism is readily caused, and there also occurs damage to gears therein, resulting in a failure to perform an intended operation.

In the speed reducing device used to form a joint of such a humanoid robot, it is extremely important to prevent occurrence of loss of synchronism and damage to the gears from the viewpoint of stabilizing an operation of the humanoid robot and eventually enhancing commercialization of the humanoid robot.

To this end, it has been conceived to provide the speed reducing device with an impact unit formed of an elastic member.

On the other hand, it is also desired that a load torque of the speed reducing device in operation be measured for the purpose of safe and stable use of the speed reducing device.

SUMMARY

The present invention has been made in view of the foregoing, and an object of the present invention is to provide a speed reducing device capable of reliably measuring a load torque.

In order to solve the above-described problems, provided are inventions including the following. That is, there is provided a speed reducing device including a speed reducing portion for reducing a rotation speed of an output with respect to an input between an input rotary shaft and an output rotary shaft, a housing that houses the speed reducing portion, a buffer unit formed of an elastic member and having a cushion force acting mainly in a substantially rotational tangential direction between the housing and the speed reducing portion, and a measurement unit for measuring an amount of displacement generated in the housing by the buffer unit.

Advantages

The present invention can provide a speed reducing device capable of reliably measuring a load torque.

BRIEF DESCRIPTION OF THE DRAWINGS

FIG. 2a is a sectional view of the speed reducing device shown in FIG. 1a.

FIG. 2b is an enlarged conceptual view of part of the speed reducing device shown in FIG. 1a.

DESCRIPTION OF THE PREFERRED EMBODIMENTS

The following describes embodiments of the present invention. The present invention is not intended to be limited in any sense to these embodiments and may be implemented in various forms without departing from the gist of the invention.

Embodiment 1

<Outline> A speed reducing device according to this embodiment includes a speed reducing portion for reducing a rotation speed of an output with respect to an input between an input rotary shaft and an output rotary shaft, a housing that houses the speed reducing portion, a buffer unit formed of an elastic member and having a cushion force acting mainly in a substantially rotational tangential direction between the housing and the speed reducing portion, and a measurement unit for measuring an amount of displacement generated in the housing by the buffer unit. The buffer unit absorbs an excessive load on the rotary shafts of the speed reducing portion, thus preventing damage to various components such as gears used to form the speed reducing portion. Furthermore, the measurement unit measures a load torque applied to the speed reducing device.

Figure 1A:
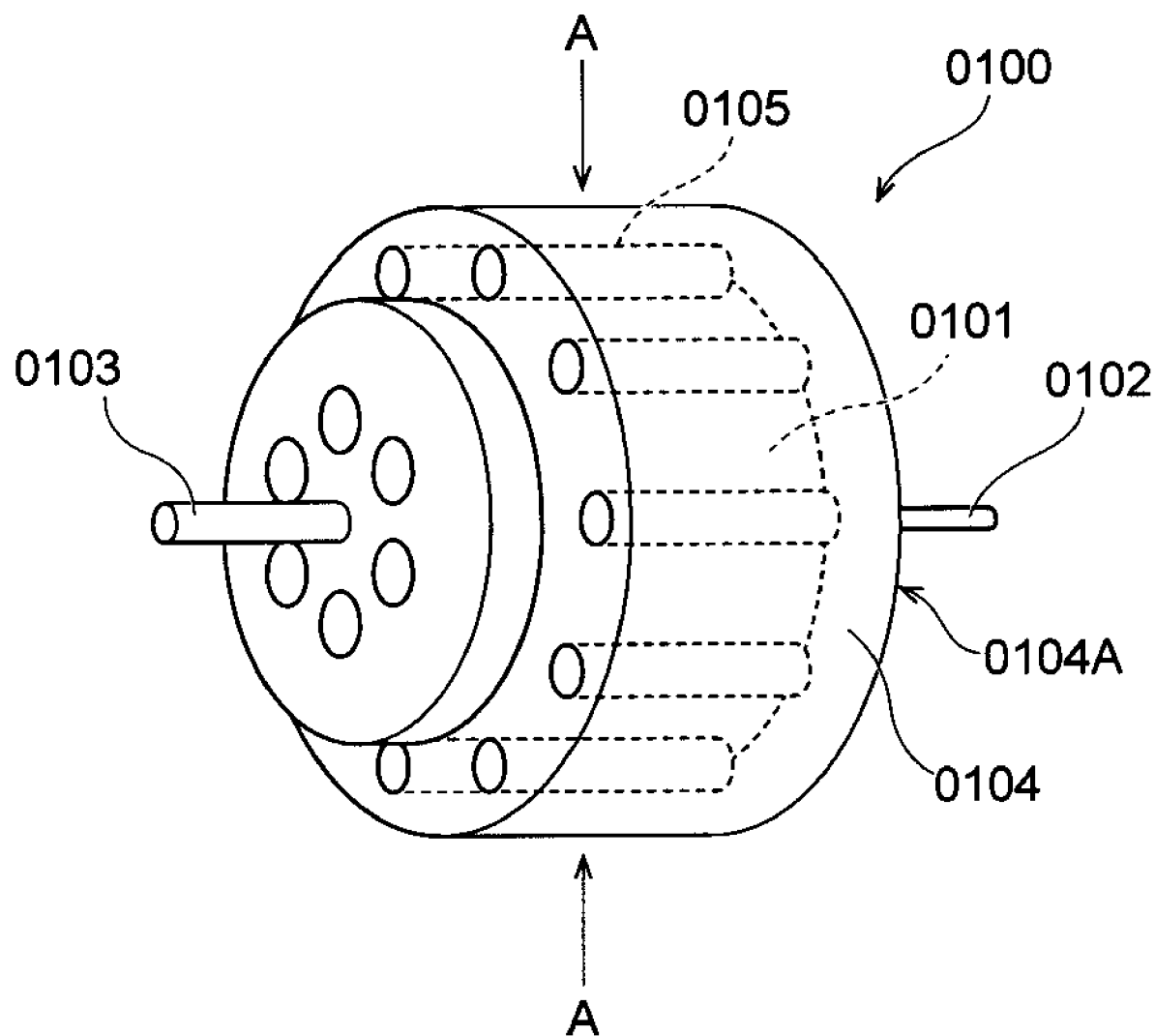
FIG. 1a is a conceptual view showing one example of a speed reducing device according to Embodiment 1.
Figure 1B:
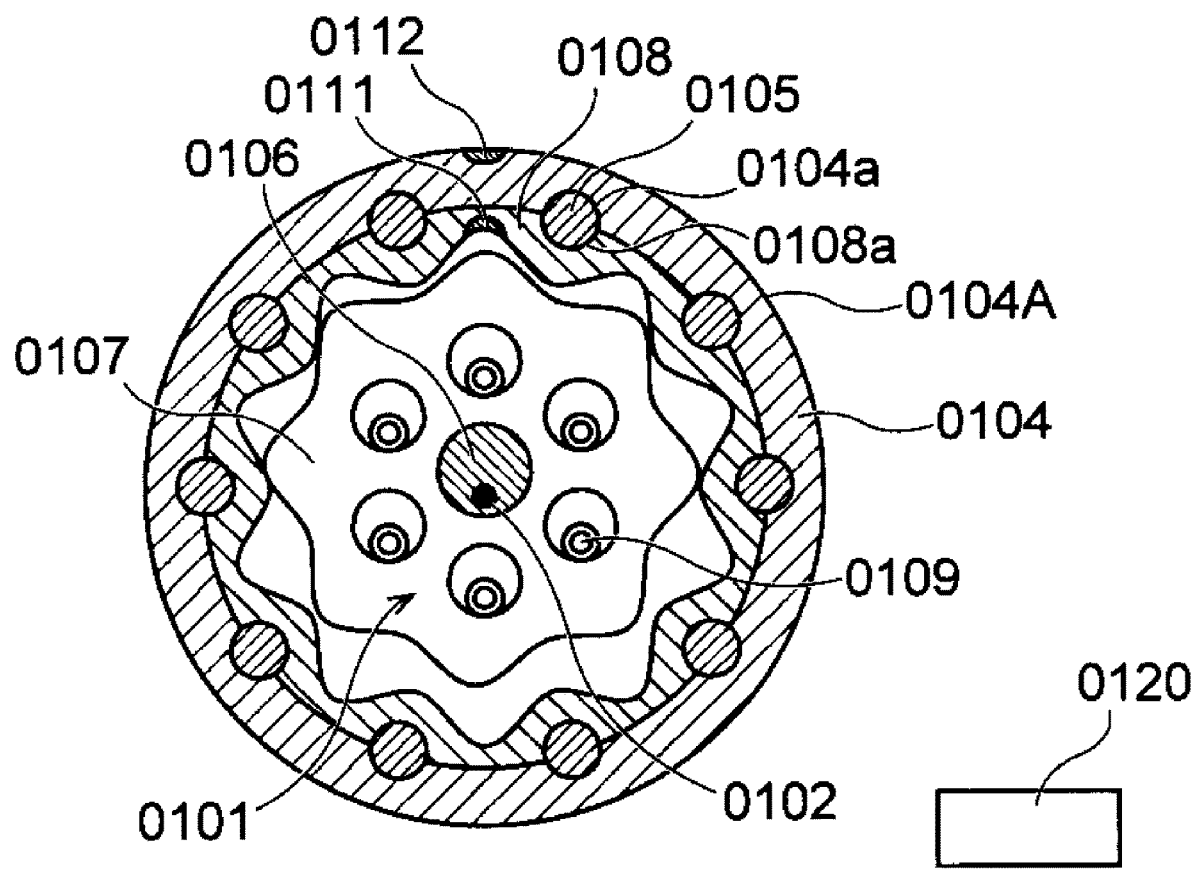
FIG. 1b is a conceptual view showing one example of the speed reducing device according to Embodiment 1.

<Configuration> The speed reducing device according to this embodiment is composed of a speed reducing mechanism (referred to also as the speed reducing portion), the housing, and the buffer unit. FIGS. 1a and 1b are conceptual views showing one example of this speed reducing device. FIG. 1a is a conceptual view showing the housing in such a manner that the inside thereof is partly seen through. Furthermore, FIG. 1b is a conceptual view showing a cross section in an "A-A" direction in FIG. 1a.

As shown in the figures, a "speed reducing device" 0100 is composed of a "speed reducing mechanism" (referred to also as a "speed reducing portion") 0101 for reducing an output with respect to an input between an "input rotary shaft" 0102 and an "output rotary shaft" 0103, a metallic "housing body" 0104 housing the speed reducing mechanism 0101, and a buffer unit configured by a plurality of "elastic members" 0105 arranged on an outer contour of the speed reducing mechanism 0101.

Each of the elastic members 0105 has a columnar shape and is arranged in a state of being fitted between a groove 0108a and a groove 0104a so as to be secured by each of them. The groove 0108a is provided on an outer peripheral surface of an internal gear 0108, and the groove 0104a is provided on an inner peripheral surface of the housing body 0104. Furthermore, each of the elastic members 0105 is arranged so that a longitudinal direction thereof is substantially parallel to an axial direction of the input rotary shaft 0102 or the output rotary shaft 0103. Furthermore, each of the elastic members 0105 may be arranged so that the longitudinal direction thereof is inclined at a given angle with respect to the axial direction of the input rotary shaft 0102 or the output rotary shaft 0103. In this case, a total area for arranging the elastic members 0105 can be increased compared with a case of the earlier described arrangement.

FIG. 1b shows an eccentric oscillating speed reducing mechanism as the speed reducing mechanism 0101. As shown in the figure, the "input rotary shaft" 0102 is connected to a "crank" 0106, and the crank 0106 is connected to a "planetary gear" 0107. When the input rotary shaft 0102 rotates, the planetary gear 0107 rolls (rotates), with its wave-shaped teeth being in contact with the "internal gear" 0108 made of metal and having a wave-shaped contact surface. Further, while rolling (rotating) in this manner, the planetary gear 0107 revolves in a direction reverse to a rotation direction. This rotation is taken out by six "internal pins" 0109. The six internal pins 0109 are arranged concentrically with a center of the input rotary shaft 0102, and thus the input rotary shaft 0102 and the output rotary shaft 0103 can be aligned concentrically with each other. Furthermore, as will be mentioned later, the speed reducing mechanism 0101 is composed of these various components except for the internal gear 0108. The speed reducing mechanism 0101 thus configured is housed by the "housing body" 0104.

Figure 5:
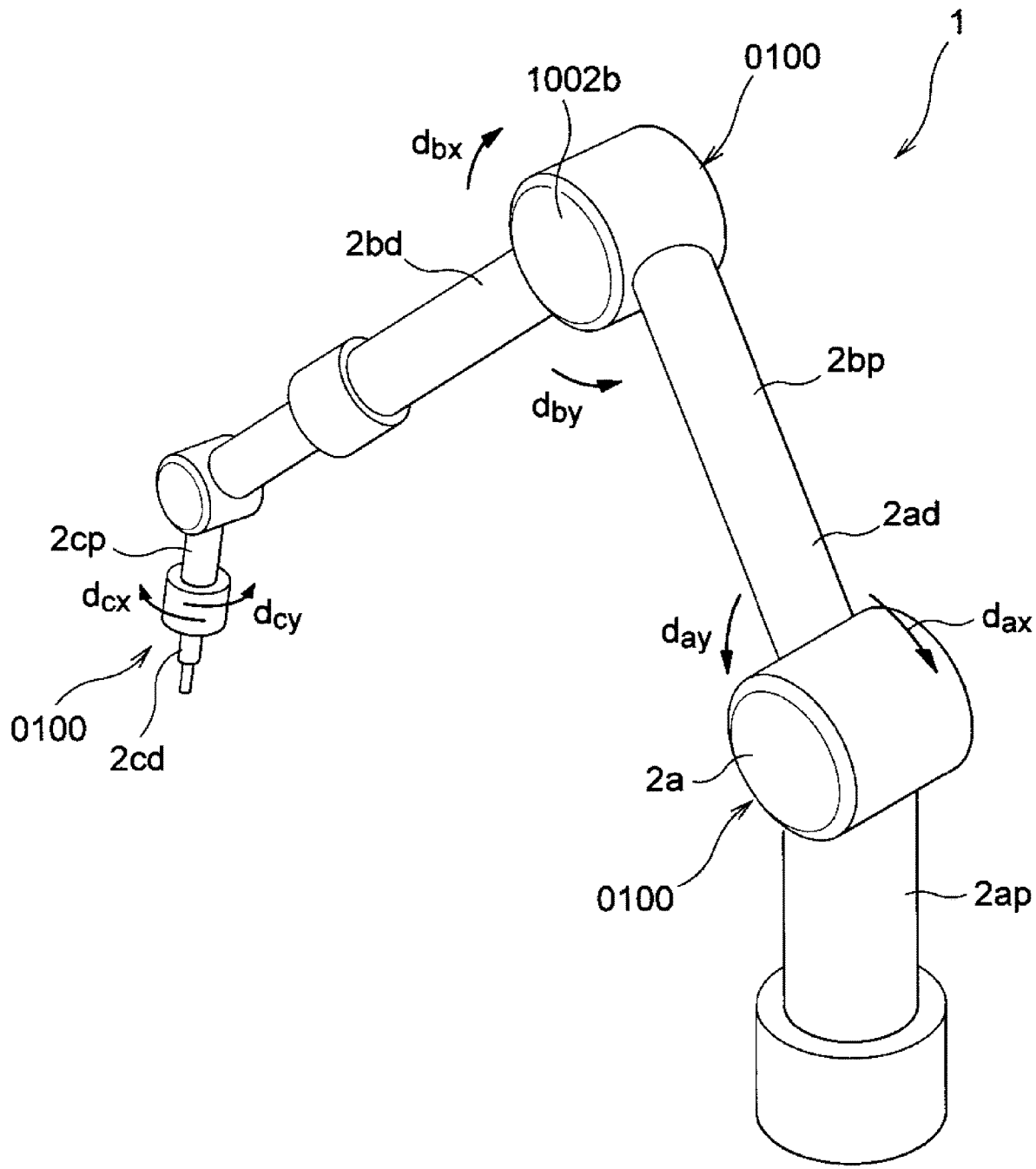
FIG. 5 is a conceptual view showing one example of an industrial robot whose joint uses the speed reducing device according to Embodiment 2.

The housing body 0104 is secured on a base side or an arm side of a joint of an after-mentioned industrial robot 1 (see FIG. 5) or an unshown humanoid robot and houses the speed reducing mechanism 0101. The input rotary shaft 0102 is a rotary shaft receiving power transmitted by a motor or the like, and the output rotary shaft 0103 is a rotary shaft outputting rotary motion reduced with respect to a rotation speed of the input rotary shaft 0102. Here, as shown in FIG. 5, the industrial robot 1 has a plurality of speed reducing devices 0100 and an arm 2ap, 2bp, and 2cp and an arm 2ad, 2bd, and 2cd as a pair connected via the plurality of speed reducing devices 0100. Furthermore, the plurality of speed reducing devices 0100 rotate relative to each other in one direction dax, dbx, and dcx or the other direction day, dby, and dcy.

The housing body 0104 is secured to one of a base side and an arm side of a joint, and thus the joint is made relatively movable on the other of the base side and the arm side. For example, in a case where the speed reducing device 0100 according to this embodiment is used in a joint of the industrial robot 1, the housing body 0104 is secured to an arm side thereof on an upper side, which is an input rotary shaft side, and thus the joint is made movable, with respect to the upper side, on a base side thereof on a lower side, which is an output rotary shaft side.

The buffer unit 0105 is formed of an elastic member and configured to have a cushion force acting mainly in a substantially rotational tangential direction between the housing body 0104 and the speed reducing mechanism 0101. In FIG. 1b, the housing body 0104 and the internal gear 0108 constitute a housing 0104A.

Furthermore, as shown in FIG. 1b, in the internal gear 0108 and the housing body 0104 constituting the housing 0104A, a magnet 0111 is embedded in an inner peripheral surface of the internal gear 0108, and a magnetic sensor 0112 is embedded in an outer peripheral surface of the housing body 0104.

Further, a center of the housing 0104A, the magnet 0111, and the magnetic sensor 0112 are lined up on a straight line (see FIG. 1b). Furthermore, during an operation, an excessive load may be applied between the input rotary shaft side and the output rotary shaft side of the speed reducing device 0100. In such a case, the buffer unit 0105 formed of an elastic member is deformed to absorb a load torque applied to the speed reducing device 0100, thus being able to prevent damage to the speed reducing mechanism 0101.

At this time, as the buffer unit 0105 is deformed, the magnetic sensor 0112 is displaced along a rotation direction with respect to the magnet 0111. Further, based on an amount of displacement of the magnetic sensor 0112 in the rotation direction, an output signal is transmitted from the magnetic sensor 0112 to a control portion 0120.

Next, based on the output signal from the magnetic sensor 0112, the control portion 0120 can determine the amount of displacement of the magnetic sensor 0112 in the rotation direction with respect to the magnet 0111. Based on the amount of displacement thus determined, the control portion 0120 can reliably measure a value of the load torque applied to the speed reducing device 0100.

As described above, by use of the magnet 0111 and the magnetic sensor 0112, it is possible to determine an amount of displacement of the magnetic sensor 0112 in the rotation direction with respect to the magnet 0111, namely, an amount of displacement of the housing body 0104 in the rotation direction with respect to the internal gear 0108. In this case, the magnet 0111 and the magnetic sensor 0112 constitute a measurement unit for determining an amount of relative displacement generated between the internal gear 0108 and the housing body 0104.

The above-mentioned amount of displacement of the housing body 0104 in the rotation direction with respect to the internal gear 0108 agrees with an amount of deformation of the buffer unit 0105.

Figure 2A:
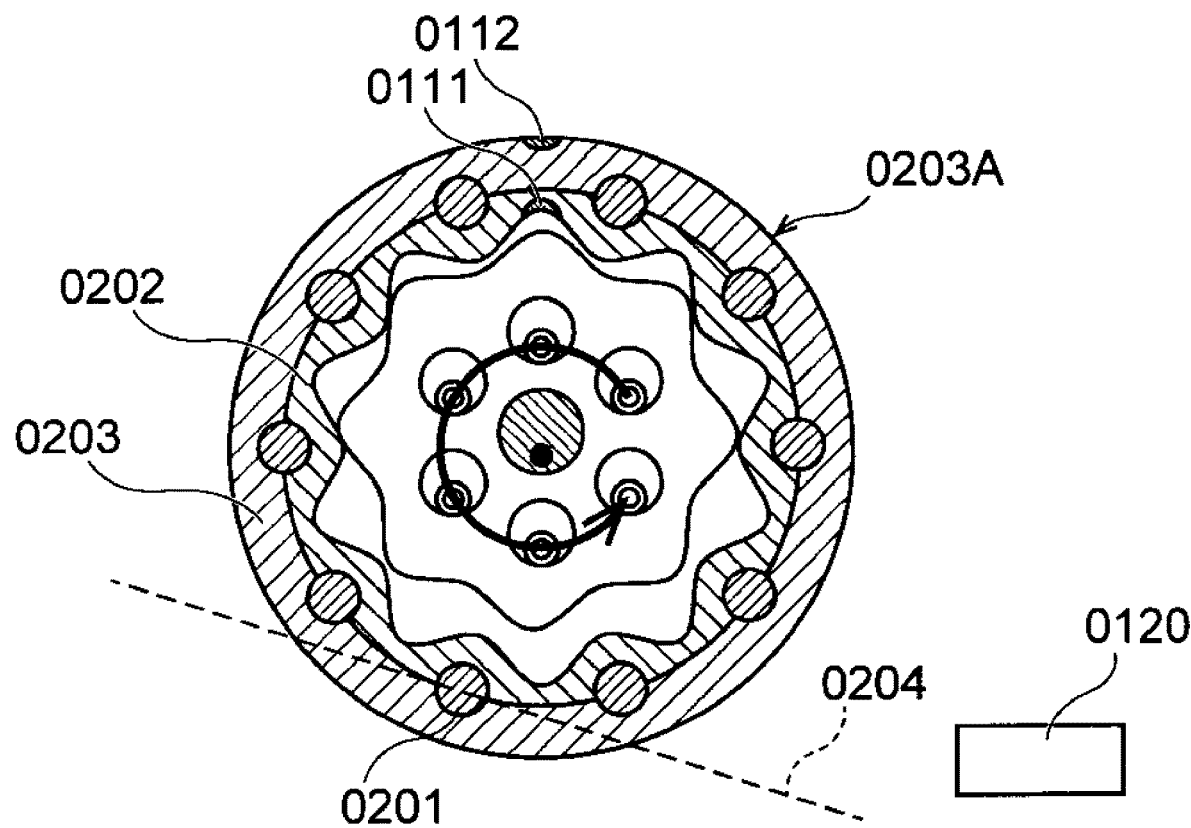
Figure 2B:
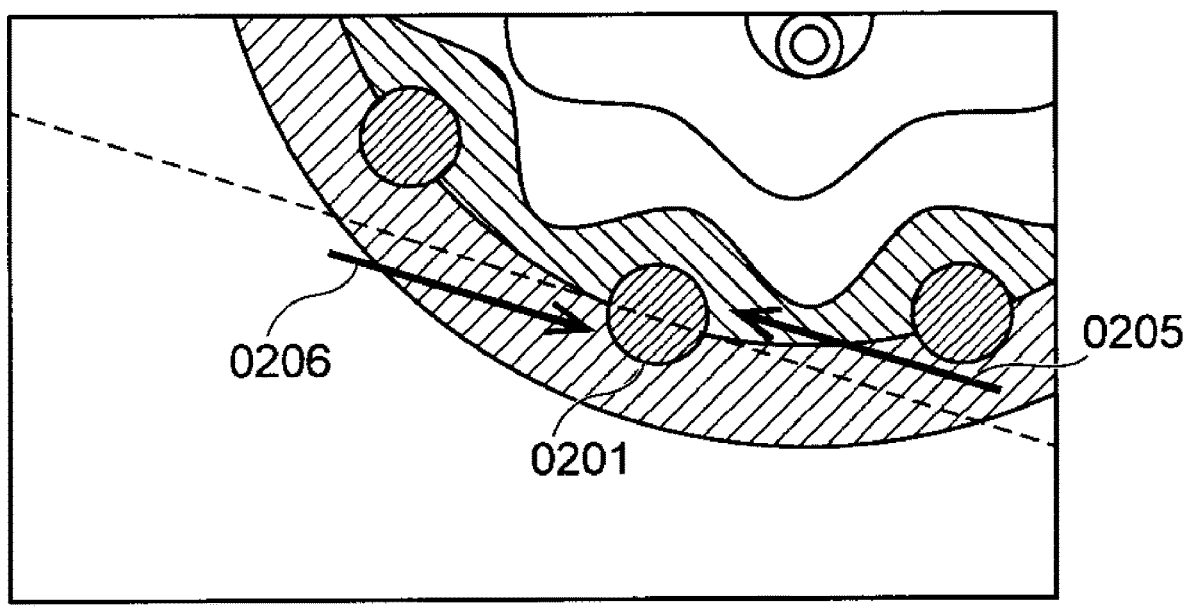
Figure 3:
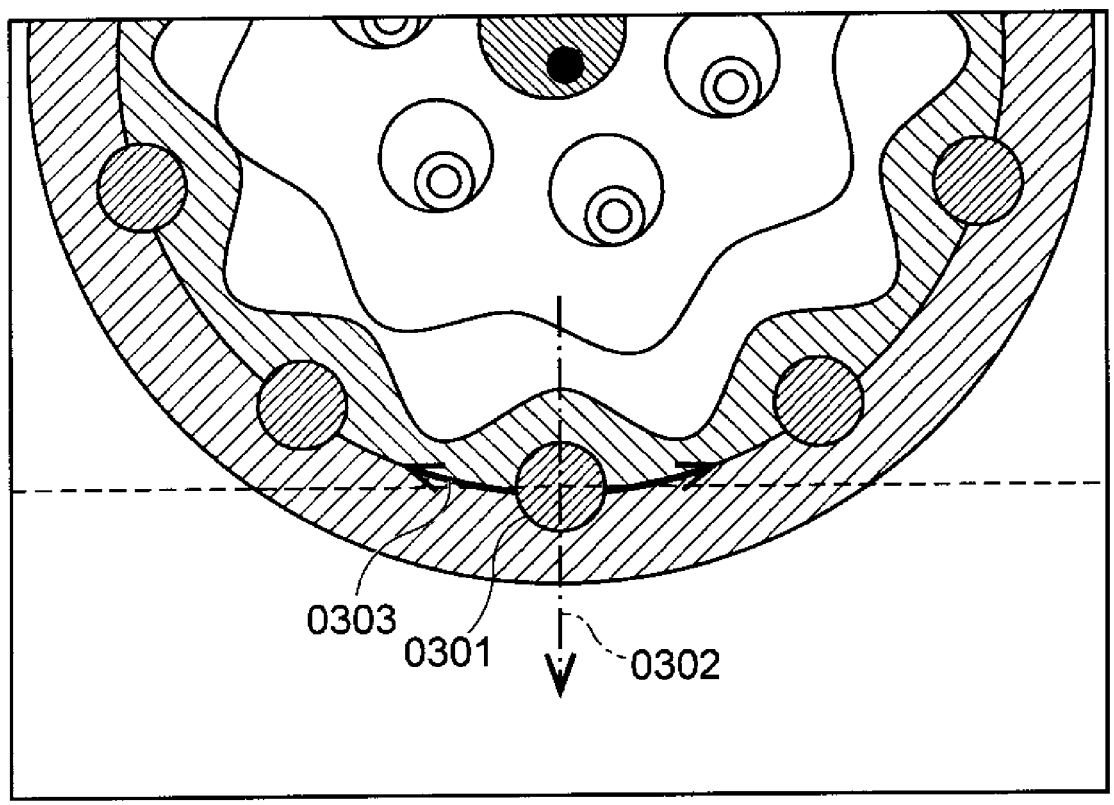
FIG. 3 is a conceptual view for explaining the shape of an elastic member.

Next, with reference to FIG. 2 and FIG. 3, a further description is given of the speed reducing device 0100 according to this embodiment.

FIG. 2*a* is a sectional view of the speed reducing device 0100 shown in FIG. 1*a*, and FIG. 2*b* is an enlarged conceptual view of part of the speed reducing device 0100 shown in FIG. 1*a*. One "elastic member" 0201 used to form the buffer unit 0105 is arranged in a state of being fitted between an "internal gear" 0202 and a "housing body" 0203 so as to be secured by both of them. The internal gear 0202 constitutes an outer contour of the speed reducing mechanism 0101, and the hosing body 0203 houses the speed reducing mechanism 0101.

Here, consideration is given to a case where the housing body 0203 is secured to the input rotary shaft side. In this case, a rotation direction of the output rotary shaft 0103 is assumed to be counterclockwise as depicted over the six internal pins 0109. In this case, when an excessive load is applied to the arms 2*ap*, 2*bp*, and 2*cp* and 2*ad*, 2*bd*, and 2*cd* of the industrial robot 1, which are connected to the output rotary shaft 0103, and an arm or a leg of a humanoid robot (for example, when motion of an arm or a leg is hampered due to an unexpected collision with a human or due to an obstacle or the like), on the one "elastic member" 0201, a force is exerted in a substantially rotational tangential direction (a broken line 0204 in the figure) at a position of said elastic member 0201 on a circumference of a circle centered at the input rotary shaft 0102 or the output rotary shaft 0103 and having a radius equal to a distance from the input rotary shaft 0102 or the output rotary shaft 0103 to said elastic member 0201.

As shown in the enlarged view, when an excessive load is applied to an arm or a leg connected to the output rotary shaft 0103, a force in a rotation direction reverse to a rotation direction of the output rotary shaft 0103 is exerted (an arrow 0205 in the figure) from the output rotary shaft 0103 to the internal gear 0202 constituting the outer contour of the speed reducing mechanism 0101 via the internal pins 0109 and the planetary gear 0107. On the other hand, the housing body 0203 is secured to the input rotary shaft side, and thus in the above-described rotational tangential direction, a reversely directed force is exerted (an arrow 0206 in the figure) as a reaction to a force undergone by the output rotary shaft 0103. The elastic member 0201 is bent (deformed) so as to absorb those forces exerted thereon. In addition to the elastic member 0201, a plurality of such elastic members are arranged in the speed reducing device 0100. Each of the plurality of elastic members are similarly bent so as to absorb any force applied to the output rotary shaft 0103. An action of being bent so as to absorb a force in this manner is referred to as a cushion action, and a direction of the force thus absorbed is referred to as a cushion force acting direction.

Since a buffer action is obtained through bending of the elastic member 0201, it is not preferable that, in an area where an outer peripheral surface of the internal gear 0202 and an inner peripheral surface of the housing body 0203 come in contact with each other without the elastic member 0201 interposed therebetween, the outer peripheral surface of the internal gear 0202 and the inner peripheral surface of the housing body 0203 are bonded or jointed to each other.

Furthermore, a lubricant may be provided on a contact surface between the outer peripheral surface of the internal gear 0202 and the inner peripheral surface of the housing body 0203. In this case, a force exerted on the speed reducing mechanism 0101 due to an excessive load or the like can be concentrated by the elastic member 0201, and thus damage to the speed reducing mechanism 0101 and the housing body 0203 can be further prevented. In FIG. 2*a*, the housing body 0203 and the internal gear 0202 constitute a housing 0203A.

With reference to FIG. 3, a description is given further of the shape of the elastic member. As shown in FIG. 3, in a case where an "elastic member" 0301 has a substantially perfect circular shape in cross section, the cross-sectional shape is line-symmetric with respect to a normal direction (a chain line 0302 in the figure). With such a cross-sectional shape, no matter whether the elastic member 0301 undergoes a force in a forward direction or a reverse direction (a thick double-headed arrow 0303 in the figure), a cushion force is exerted equally in the both directions.

An external force such as an excessive load on the speed reducing mechanism 0101 acts in the rotational tangential direction in which the input rotary shaft 0102 or the output rotary shaft 0103 is rotated and thus can act in both of the forward direction and the reverse direction. It is, therefore, not preferable that a cushion force with respect to the forward direction is larger than a cushion force with respect to the reverse direction or vice versa. Thus, as shown in FIG. 3, preferably, the elastic member 0301 has a cross-sectional shape symmetric with respect to the normal direction.

Next, a description is given of an arrangement of the elastic member used to form the buffer unit 0105. As mentioned above, the buffer unit 0105 is intended to exert a cushion force mainly in the rotational tangential direction in which the input rotary shaft 0102 or the output rotary shaft 0103 is rotated. Furthermore, preferably, a cushion force is exerted equally with respect to either of the forward direction and the reverse direction. For this reason, preferably, the elastic members are arranged so as to be substantially point-symmetric about a center of the input rotary shaft 0102 or/and the output rotary shaft 0103.

Furthermore, as a material of the elastic members 0105, 0201, and 0301, a rubber made of a synthetic resin such as a urethane rubber or a silicone rubber can be used, or the material may be a natural rubber or the like. Furthermore, a spring such as a helical spring or a leaf spring may be arranged as the elastic member. In this case, the spring is set so as to be expanded/contracted in a direction aligned to the rotational tangential direction. In a high temperature environment where a rubber made of resin might melt, it is favorable to use a spring made of a metal having heat resistance as the elastic member.

Furthermore, oil may be used as the elastic members 0105, 0201, and 0301. For example, a flow path for oil is provided between the outer peripheral surface of the internal gear 0108 and an inner peripheral surface of the housing 0104A or between the outer peripheral surface of the internal gear 0202 and an inner peripheral surface of the housing 0203A, and a flow rate of the oil caused to flow through said flow path is adjusted. In this manner, an elastic member can also be configured by an adjustable oil pressure. In a case where it is difficult to form a sealed flow path by using the internal gear 0108 and the housing 0104A alone or the internal gear 0202 and the housing 0203A alone, an elastic member may be formed by providing a groove for arranging an expandable/contractible pipe or the like therein and causing oil to flow through the pipe or the like.

<Advantageous Effects> The speed reducing device 0100 according to this embodiment absorbs an excessive load on the input rotary shaft 0102 or the output rotary shaft 0103 of the speed reducing mechanism 0101, thus being able to prevent damage to the various components such as gears used to form the speed reducing mechanism 0101.

Furthermore, according to this embodiment, by use of the magnet 0111 and the magnetic sensor 0112, it is possible to determine an amount of relative displacement generated between the internal gear 0108 and the housing body 0104, and based on this amount of displacement, it is possible to reliably measure a value of a load torque applied to the speed reducing device 0100.

Typically, in a case of determining a load torque applied to the speed reducing device 0100, the housing body 0104 and the internal gear 0108 are made of metal and thus are small in amount of deformation. Because of this, in order to determine a value of a load torque based on such a small amount of deformation, it is required to use a high-resolution and high-performance sensor.

In contrast, according to this embodiment, the buffer unit 0105 formed of an elastic member is deformed to a large degree, and thus an amount of relative displacement between the housing body 0104 and the internal gear 0108 can be increased, so that it is possible to reliably measure a load torque applied to the speed reducing device 0100 without the need to use a high-resolution and high-performance sensor.

Furthermore, without the need to provide a plurality of strain gauges in the speed reducing device 0100, merely by providing a combination of the magnet 0111 and the magnetic sensor 0112, a value of a load torque applied to the speed reducing device 0100 can be easily measured.

In the industrial robot 1 for performing cooperative work with a human, unexpected contact with the human acts as an impact on the human and the speed reducing device 0100 of the industrial robot 1. Such an impact might cause injury to the human and loss of synchronism in the strain wave gearing speed reducer having a flexible configuration in the speed reducing mechanism 0101 of the industrial robot 1. Moreover, such an impact might cause damage to gears, resulting in a failure to perform an operation.

In the industrial robot 1 for performing cooperative work with a human, in order to prevent harm to the human, it is extremely important to take safety measures in terms not only of software but also of hardware. Also in the speed reducing device 0100, by preventing occurrence of loss of synchronism and damage to gears, it is possible to stabilize an operation of the industrial robot 1.

Embodiment 2

<Outline> Based on the speed reducing device 0100 according to Embodiment 1, this embodiment provides a speed reducing device including an eccentric oscillating speed reducing mechanism as a speed reducing mechanism. In this speed reducing device, an internal gear and a planetary gear are made of plastic, a metallic ring for securing the internal gear is provided, and an elastic member is arranged between the metallic ring and a housing.

With such a configuration, the speed reducing device can be reduced in weight. Further, the internal gear and the planetary gear are encapsulated by the metallic ring, and thus, for example, even when a humanoid robot using this speed reducing device in its joint is subjected to an impact due to tipping or the like, the internal gear and the planetary gear can be protected from damage. Furthermore, since the internal gear is made of plastic having flexibility, when the internal gear is enclosed with the metallic ring having excellent rigidity, stress generated in the internal gear is dispersed, and thus damage to the internal gear can be prevented.

Figure 4:
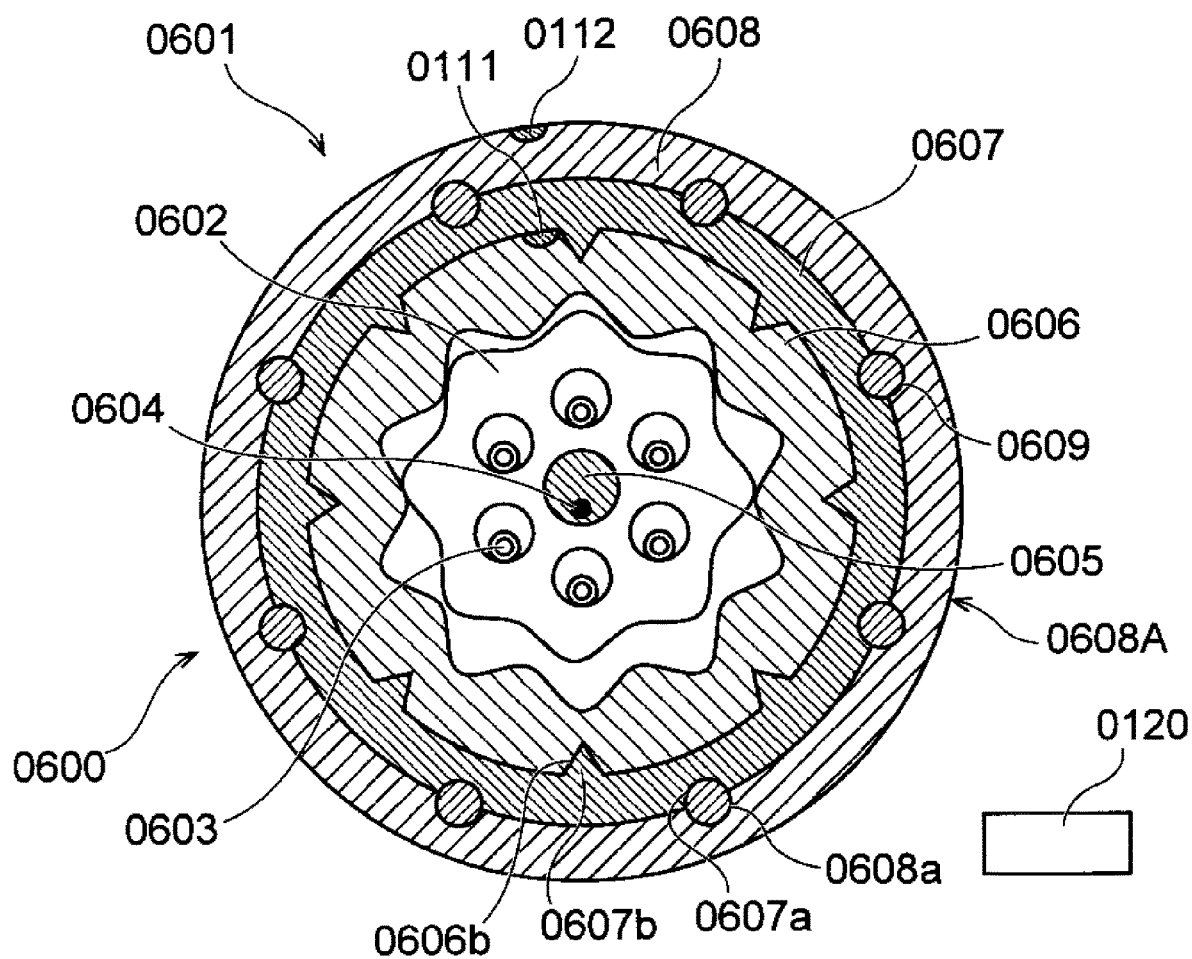
FIG. 4 is a conceptual view showing one example of a speed reducing device according to Embodiment 2.

<Configuration> FIG. 4 is a conceptual view showing one example of a cross section of a speed reducing device according to this embodiment. In a "speed reducing device" 0600, an eccentric oscillating speed reducing function is achieved by an "internal gear" 0606 encapsulating a "planetary gear" 0602, an "internal pin" 0603, an "input rotary shaft" 0604, a "crank" 0605, and so on. Furthermore, an "internal gear securing ring" 0607 for further securing the internal gear 0606 is provided on an outer periphery of the internal gear 0606. Further, a plurality of "elastic members" 0609 constituting a buffer unit are arranged between a "housing body" 0608 surrounding the internal gear securing ring 0607 and the internal gear securing ring 0607.

Here, the speed reducing device 0600 includes a speed reducing mechanism (a speed reducing portion) 0601 having the planetary gear 0602, the internal pin 0603, the input rotary shaft 0604, and the crank 0605.

Further, among these constituent components, at least the internal gear 0606 and the planetary gear 0602 are made of plastic. The crank 0605 and the internal pin 0603 may also be made of plastic. These components are made of plastic, and thus the speed reducing device 0600 can be reduced in weight.

Furthermore, the housing body 0608 and the internal gear securing ring 0607 are made of metal. There is no particular limitation on a specific type of metal that can be used, and examples thereof include iron, steel, stainless steel, aluminum, and an aluminum alloy.

As shown in the figure, a V-shaped groove 0606*b* is provided on an outer periphery of the internal gear 0606, and a protrusion 0607*b* to be fitted in the groove 0606*b* of the internal gear 0606 is provided on an inner periphery of the internal gear securing ring 0607. In this manner, the internal gear 0606 is secured by the internal gear securing ring 0607. Further, similarly to the internal gears 0108 and 0202 in Embodiment 1, a groove 0607*a* for fitting each of the elastic members 0609 therein is provided on an outer peripheral surface of the internal gear securing ring 0607, and a groove 0608*a* for fitting the each of the elastic members 0609 therein is similarly provided also on an inner peripheral surface of the housing body 0608.

As mentioned above, each of the elastic members 0609 is arranged so as to be fitted in both of the groove 0607*a* provided in the internal gear securing ring 0607 and the groove 0608*a* provided in the housing body 0608. Further, the outer peripheral surface of the internal gear securing ring 0607 and the inner peripheral surface of the housing body 0608 are disposed so as to be in contact with each other except for an area where each of the elastic members 0609 is arranged between the groove 0607*a* and the groove 0608*a*. Preferably, from the viewpoint of increasing mechanical strength of the speed reducing device 0600, these surfaces are disposed so as not to generate a gap therebetween.

Furthermore, a heating element (for example, nichrome wire) may be arranged inside a metal forming the internal gear securing ring 0607 or on an inner peripheral surface of the internal gear securing ring 0607 in a vicinity of a location where each of the elastic members 0609 is arranged. Elasticity of rubber can vary depending on a temperature. Based on this, a configuration may be adopted in which a heating element is arranged in a vicinity of each of the elastic members 0609 so that, through heating by the heating element, elasticity of the each of the elastic members 0609 can be appropriately adjusted.

In FIG. 4, the housing body 0608, the internal gear securing ring 0607, and the internal gear 0606 constitute a housing 0608A. Furthermore, the housing body 0608 constitutes an outer case of the housing 0608A, and the internal gear securing ring 0607 constitutes an inner case of the housing 0608A.

Moreover, as mentioned above, the speed reducing mechanism 0601 has the planetary gear 0602, the internal pin 0603, the input rotary shaft 0604, and the crank 0605.

Furthermore, as shown in FIG. 4, in the housing 0608A, a magnet 0111 is embedded in the inner peripheral surface of the internal gear securing ring 0607, while a magnetic sensor 0112 is embedded in the outer peripheral surface of the housing body 0608.

Further, a center of the housing 0608A, the magnet 0111, and the magnetic sensor 0112 are lined up on a straight line (see FIG. 4). Furthermore, during an operation, an excessive load may be applied between an input rotary shaft side and an output rotary shaft side of the speed reducing device 0600. In such a case, the buffer unit 0609 formed of an elastic member is deformed to absorb a load torque applied to the speed reducing device 0600, thus being able to prevent damage to the speed reducing mechanism 0601.

At this time, as the buffer unit 0609 is deformed, the magnetic sensor 0112 is displaced along a rotation direction with respect to the magnet 0111. Further, based on an amount of displacement of the magnetic sensor 0112 in the rotation direction, an output signal is transmitted from the magnetic sensor 0112 to a control portion 0120.

Next, based on the output signal from the magnetic sensor 0112, the control portion 0120 can determine the amount of displacement of the magnetic sensor 0112 in the rotation direction with respect to the magnet 0111. Based on the amount of displacement, a value of a load torque applied to the speed reducing device 0600 can be reliably measured.

As described above, by use of the magnet 0111 and the magnetic sensor 0112, it is possible to determine an amount of displacement of the magnetic sensor 0112 in the rotation direction with respect to the magnet 0111, namely, an amount of displacement of the housing body 0104 in the rotation direction with respect to the internal gear securing ring 0607. In this case, the magnet 0111 and the magnetic sensor 0112 constitute a measurement unit for determining an amount of relative displacement generated between the internal gear securing ring 0607 and the housing body 0608.

The above-mentioned amount of displacement of the housing body 0608 in the rotation direction with respect to the internal gear securing ring 0607 agrees with an amount of deformation of the buffer unit 0609.

Modification Example

Next, a description is given of a modification example of the present invention. While Embodiment 2 shown in FIG. 4 has described an example in which the housing body 0608 and the internal gear securing ring 0607 are made of metal, and the internal gear 0606 is made plastic, there is no limitation thereto. A configuration may be also adopted in which the housing body 0608 and the internal gear securing ring 0607 are made of metal, and the internal gear 0606 is formed of an elastic member made of an urethane rubber or a silicone rubber and thus having elasticity higher than that in the case where the internal gear 0606 is made of plastic.

In a case where the internal gear 0606 is formed of an elastic member as described above, the buffer unit 0609 formed of an elastic member provided between the housing body 0608 and the internal gear securing ring 0607 can be omitted, and in this case, instead of the buffer unit 0609, the internal gear 0606 formed of an elastic member can absorb a load torque applied to the speed reducing device 0600.

In a case where the buffer unit 0609 formed of an elastic member is omitted from between the housing body 0608 and the internal gear securing ring 0607, the housing body 0608 and the internal gear securing ring 0607 are firmly engaged with each other as appropriate along a circumferential direction by an engagement unit (not shown).

In this case, it is desirable that, instead of being embedded in the inner peripheral surface of the internal gear securing ring 0607, the magnet 0111 be installed in the internal gear 0606 on an inner peripheral surface side thereof.

What is claimed is:

1. A speed reducing device, comprising:
   a speed reducing portion configured to reduce; a rotation speed of an output with respect to an input between an input rotary shaft and an output rotary shaft;
   a housing that houses the speed reducing portion;
   a buffer unit formed of an elastic member and configured to have a cushion force acting mainly in a substantially rotational tangential direction between the housing and the speed reducing portion; and
   a displacement sensor configured to measure an amount of displacement generated in the housing by the buffer unit,
   wherein the housing includes an outer case and an inner case, the inner case disposed within and radially inwardly from the outer case such that an outer peripheral surface of the inner case is in contact with an inner peripheral surface of the outer case, and
   wherein the buffer unit is disposed radially between the outer case and the inner case.

2. The speed reducing device according to claim 1, wherein the displacement sensor is configured to measure an amount of displacement between the outer case and the inner case.

3. The speed reducing device according to claim 1, wherein the displacement sensor is configured to measure an amount of deformation of the buffer unit.

4. The speed reducing device according to claim 1, wherein an internal gear is formed in the inner case of the housing, the internal gear forming the speed reducing portion.

* * * * *